June 13, 1961 L. S. WOOD 2,988,399
VEHICLE DUMP BODY AND HOIST MECHANISM THEREFOR
Filed Aug. 25, 1955 4 Sheets-Sheet 1

INVENTOR.
Louis S. Wood
BY
ATTORNEYS.

June 13, 1961 L. S. WOOD 2,988,399
VEHICLE DUMP BODY AND HOIST MECHANISM THEREFOR
Filed Aug. 25, 1955 4 Sheets-Sheet 2

INVENTOR.
LOUIS S. WOOD
BY
Isler & Ornstein
ATTORNEYS.

June 13, 1961 L. S. WOOD 2,988,399
VEHICLE DUMP BODY AND HOIST MECHANISM THEREFOR
Filed Aug. 25, 1955 4 Sheets-Sheet 3

INVENTOR.
LOUIS S. WOOD
BY
ATTORNEYS.

June 13, 1961 L. S. WOOD 2,988,399
VEHICLE DUMP BODY AND HOIST MECHANISM THEREFOR
Filed Aug. 25, 1955 4 Sheets-Sheet 4
FIG. 4
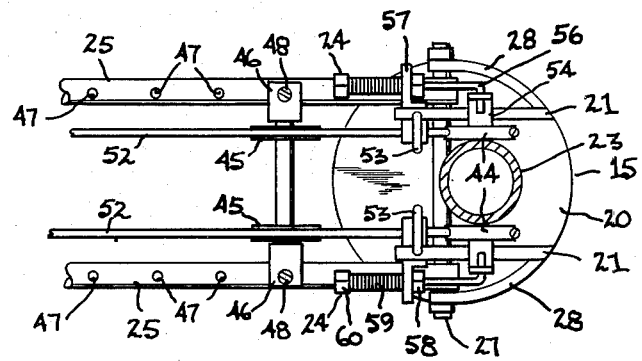
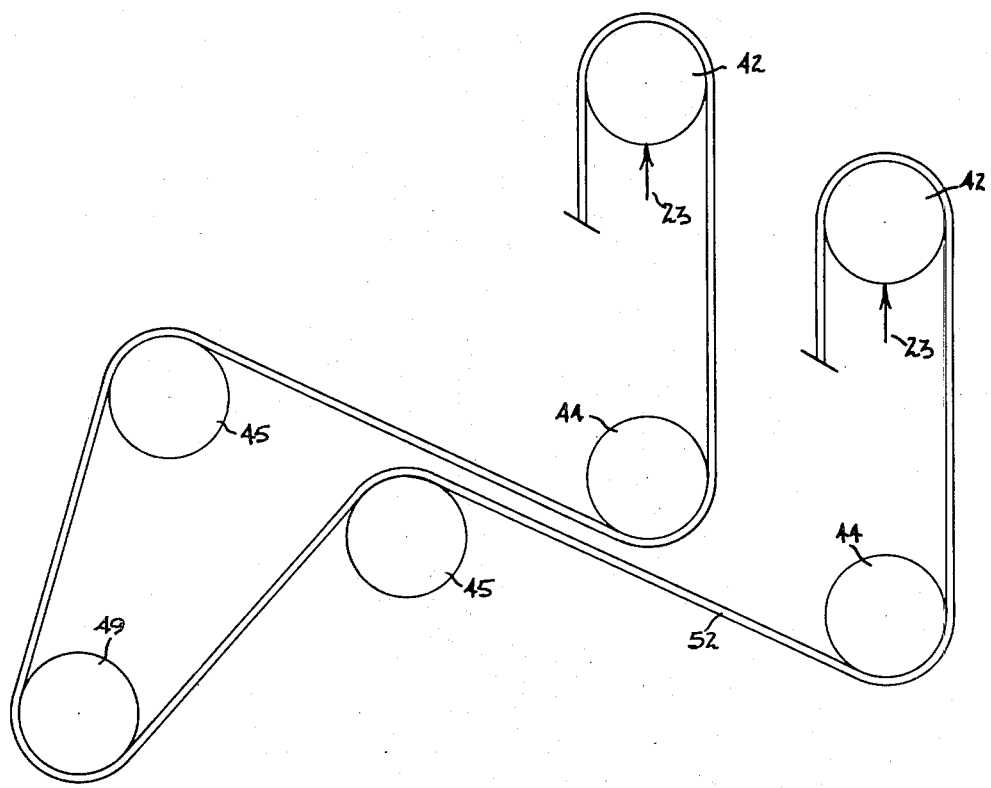
FIG. 5
INVENTOR.
LOUIS S. WOOD
BY
*Isler & Ornstein*
ATTORNEYS.

United States Patent Office 2,988,399
Patented June 13, 1961

2,988,399
VEHICLE DUMP BODY AND HOIST MECHANISM THEREFOR
Louis S. Wood, Findlay, Ohio, assignor to The Perfection Steel Body Company, Galion, Ohio, a corporation of Ohio
Filed Aug. 25, 1955, Ser. No. 530,576
11 Claims. (Cl. 298—20)

The present invention relates in general to elevatable bodies for wheeled vehicles, and more particularly to a dump body in the form of a trailer unit which may be connected or attached to a prime mover.

Although the invention is particularly described with relation to a trailer unit, it will be perceived that, in its broadest concept, the invention contemplates a hoist arrangement in which the elevatable unit or load-carrying body is longitudinally movable relatively to the hoist structure, in addition to being pivotally or hingedly connected or associated therewith.

It is a primary object of my invention to provide an improved hoisting arrangement for dump bodies which will operate efficiently and easily and will require less power than heretofore required for comparable loads.

Another object of my invention is to provide a self-contained elevatable body unit in which all of the operating elements of the hoist mechanism are associated with the body as a unit, so that, as a trailer unit, it can be connected to conventional truck-tractor units without requiring any especial modification or adaptation of such tractor units.

Other objects and advantages of my invention will be apparent during the course of the following description.

In the accompanying drawings forming a part of this specification, and in which like numerals are employed to designate like parts throughout the same:

FIG. 4 is a fragmentary top plan view taken as indicated on line 4—4 of FIG. 2 and showing details of the position regulator.

FIG. 5 is a schematic view showing the cable and pulley arrangement which is utilized in the dump body unit.

Figure 1:
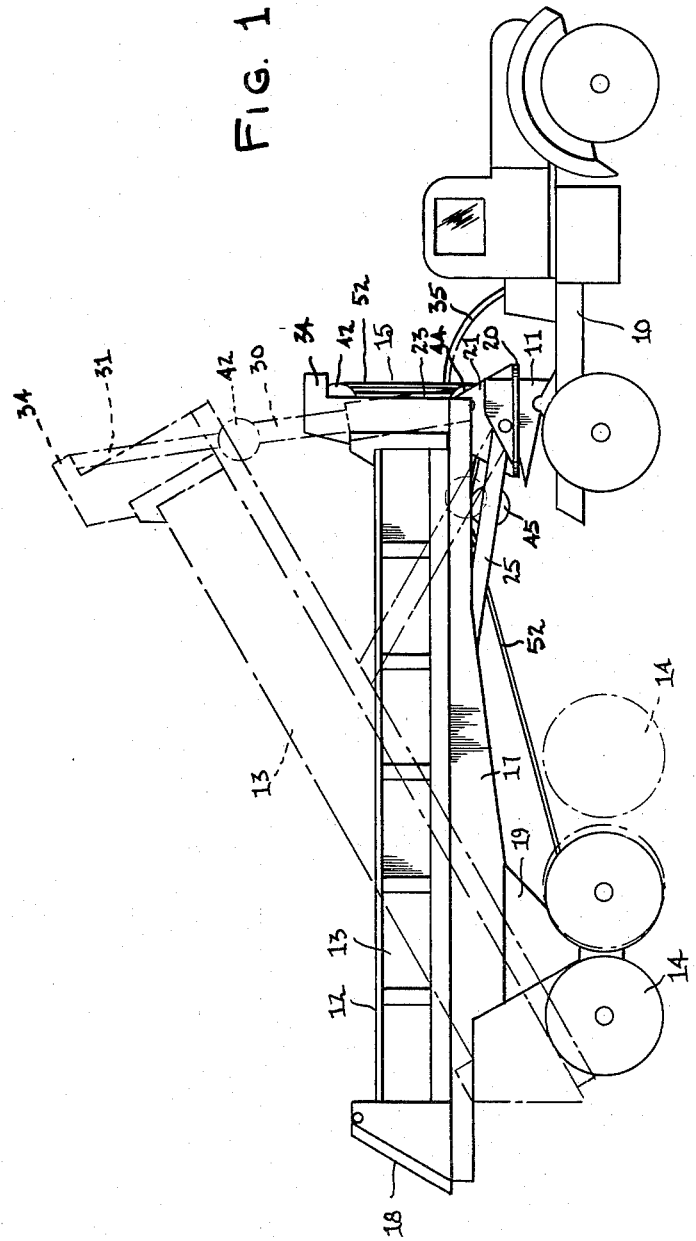
FIG. 1 is a side elevation of a dump body unit embodying the features of my invention and showing the body unit in its horizontal or lowered position in solid lines and in an intermediate position of elevation in dotted outline.

Referring more particularly to the drawings, I have shown a conventional tractor unit 10 which is equipped with a conventional fifth wheel connector 11.

The trailer unit, indicated generally by the reference character 12, consists of a materials-carrying body 13 pivotally mounted on a conventional wheeled axle assembly 14 and having an elevating or hoist mechanism 15 connected thereto.

The body 13 is suitably trussed and braced by structural reinforcing elements 16 and 17 so as to be self-sustaining under the load for which it is designed, and therefore requires no auxiliary frame or chassis structure. A hinged tail gate 18 is mounted on the rear end of the body 13 to permit controlled dumping or discharge of the contents of the body as it is elevated. The gate 18 can be unlatched manually or automatically by conventional means known to those skilled in the art. The body is pivotally or hingedly secured to the axle assembly 14 by a strongly reinforced arm or bracket member 19 which depends from the underside of the body and is secured to the axle assembly in a manner known to the art.

The hoist mechanism 15 includes a base or support plate 20 which is adapted to be rotatably and releasably connected to the fifth wheel 11 of the tractor in a conventional manner. The base plate 20 is provided with a pair of horizontally spaced uprights or trunnions 21 between which is mounted a cross-shaft 22. Power means are provided by a fluid-operated telescopic cylinder assembly 23 which is secured to the cross-shaft 22 for pivotal movement relatively to the base plate 20, and is yieldably maintained in a substantially upright or vertical position by means of a spring-loaded position regulator 24 which will be more fully described hereinafter.

A pair of stiff legs or radius rods 25 serve to connect the body 13 to the base plate 20 and serve as compression members during elevating movement of the body. The rods 25 are preferably tubular and are pivotally connected at their rearward ends to stub shafts 26, or the like, which are provided on the underside of the body approximately midway thereof. The forward end of each of the pair of rods 25 is pivotally secured to the base plate 20 by means of a cross-shaft 27 which is supported by the uprights 21 and which extends diametrically through the rods 25. A pair of upstanding walls 28, which are rigidly secured to the base plate 20 outwardly of the uprights 21, serve as additional support for the shaft 27 and also serve to position the rods 25 on the shaft 27. Removable collars 29 are secured to the ends of each of the cross-shafts 22 and 27 to prevent longitudinal displacement thereof.

The telescopic cylinder assembly 23 includes a primary ram or piston rod 30 within which is telescopically mounted a smaller secondary ram 31. The secondary ram is provided with a rounded end cap or nose 32 which is adapted to engage a socket or abutment 33 which is provided for that purpose on the body 13. In the embodiment illustrated, the socket 33 is provided by a hood-like extension 34 which is integrated with the forward end of the body. The extension 34 is rigidly secured, as by welding, to the longitudinal extending body rails 17 which project beyond the forward end of the body. The elevating or lifting force which is applied to the extension 34 is thereby transmitted directly to the structural members on the underside of the body 13, and stressing of the body panels is avoided. The socket 33, formed by the extension 34, is located at a sufficiently elevated distance above the bed of the body 13 to permit the cylinder assembly 23 to be maintained in an upright or substantially vertical position when the body 13 is down and the rams are in the fully retracted position. This arrangement permits the elevating ram to exert an initial wholly vertical thrust in contrast to the angular thrust customarily employed in hydraulic hoist mechanisms on vehicle bodies.

Although a double action telescopic cylinder could be employed if desired, I find that a single action cylinder is adequate and satisfactory for the purpose. Hydraulic pressure is supplied to the bottom of the cylinder from any suitable source by means of a suitable hose connection 35 and may conveniently be derived from the conventional hydraulic pump mechanism which is operated by the tractor engine. The hose 35 also serves as the return line for the hydraulic fluid when the rams 30 and 31 are lowered or retracted. This is accomplished by relieving the pressure on the supply line 35 by means of suitable control mechanism.

On the underside of the body 13, a pair of spaced dependent abutments 37 are rigidly secured so as to overlie and rest upon the radius rods 25 when the body 13 is in its lowermost position. By providing the abutments with a concave face portion 38 which is complementary to the contour of the rods 25, the body and rods are interconnected to minimize transverse movement or sway of the body relatively to the rods during transport by the tractor.

Releasable securing means are provided for maintaining the radius rods 25 against pivotal movement relatively to body 13. These means may conveniently be in the form of a pair of detachable chain loops 39. Each chain loop has one end thereof fixedly secured to the underside of the body and the other end thereof may be passed beneath the rod 25 and be hooked over a suitable hook or projection 40 which is provided on the underside of the body 13. The chain loops are intended to be used solely when the trailer unit is not attached to the tractor unit, and serve to prevent free swinging movement of the hoist mechanism relatively to the body.

It will be noted that the above-described structure provides an operative dump body mechanism in which the trailer and the hoist are a self-contained unit which requires only conventional connection to a tractor unit. In response to actuation of the telescopic cylinder, the forward end of the body 13 will be elevated and the rear axle assembly 14 will correspondingly be drawn forwardly. As the body 13 is elevated to the limit of stroke of the hydraulic rams, the dumping or discharge of the material takes place. Upon completion of the dumping, the pressure on supply hose 35 is released or diverted to permit the hydraulic fluid to exit from the telescopic cylinder and thus permit the rams to be returned to their retracted position with consequent lowering of the body 13.

By initially directing the thrust of the hydraulic ram vertically at a point of the body which is the furthest from the pivot point or fulcrum defined by the axle 14, maximum leverage is obtained at the start, when the load on the hoist is greatest. At the same time, the telescopic cylinder arrangement permits maximum elevating force to be applied to the body during this period of maximum load. When the primary ram 30 has been fully extended, some of the load has been relieved by shifting or discharge, so that the lesser thrust effected by the continued extension of the secondary ram 31 is adequate to continue the elevation of the body to the limit of stroke of the hoist mechanism. Thus, the power requirements of the hoist mechanism are minimized in relation to load, resulting in economy and ease of operation.

The foregoing described hoist arrangement is efficient and satisfactory if the body 13 is only required to have a moderate degree of elevation, i.e., a maximum angularity to the horizontal of about 30°. If a greater degree of angularity is required, say, 45° to 60°, practical considerations of the size of cylinder required to produce the requisite length of elevating stroke would present problems of design and operation. In view of the practical problems involved, I have provided a hoist arrangement which utilizes the above-described structure, but which is not directly limited in its degree of elevation by the maximum stroke of the hydraulic ram. I accomplish this result by utilizing the cylinder assembly 23 as a fluid motor to actuate or energize body elevating means instead of solely utilizing the hydraulic ram as the elevating means itself.

The elevating means in the illustrated embodiment comprise a form of block and tackle arrangement which is arranged to operate at a mechanical disadvantage. The end of the ram 30 has a cross-head 41 secured thereto on which are mounted a pair of sheaves or pulleys 42 which are adapted to rotate about a common horizontal axis defined by stub shafts or pins 43. A second pair of pulleys 44 is rotatably mounted on the cross-shaft 22 in straddling relationship to the telescopic cylinder 23 which projects upwardly between the pulleys 44. A third pair of pulleys 45 is mounted on the radius rods 25 intermediate the ends thereof. Instead of immovably securing the pulley frame 46 to the rods 25, as by welding, I prefer that the pulleys 45 be detachably secured so that their location on the rods 25 can be changed by adjustment. For this purpose, a series of longitudinally-spaced tapped openings 47 may be provided on the radius rods 25 and the pulley frame may be secured by bolts 48 threaded into an adjacent pair of openings 47. This provides a detachable securement which permits the position of the pulleys 45 on the rods to be changed as desired. As will be apparent hereinafter, the relative location of the pulleys 45 is of importance in relation to the rate or speed of elevation of the body 13.

A terminal pulley 49 is pivotally secured to the axle assembly 14 for bodily movement about a horizontal axis. The pulley frame 50 is linked to the underside of the body 13 by means of a yieldable connector or coil spring 51 which serves to limit downward swinging movement of the pulley 49. As the body 13 is elevated, the spring 51 tends to be tensioned and thus urges the pulley 49 upwardly so that the pulley 49 will maintain operative alignment with the other elements of the elevating means during the elevating movement of the body body 13.

A flexible tension member in the form of a cable 52 has one end thereof anchored to an eye bolt 53 which is threadedly secured to one of the uprights or trunnion members 21. The cable is trained upwardly and forwardly over one of the elevating pulleys 42; then downwardly and rearwardly under one of the directional pulleys 44; then over one of the idler pulleys 45; then around the terminal pulley 49; then forwardly over the other idler pulley 45; then under the other directional pulley 44; then upwardly over the other elevating pulley 42; and then rearwardly and downwardly where the other end is anchored to the base plate structure by means of another eye bolt 53. It will be apparent that this pulley and cable arrangement in which the force is applied to elevating pulleys 42 and the load is applied at terminal pulley 49 results in a theoretical mechanical disadvantage of 2:1.

The cable and pulley arrangement, as actuated by the primary ram 30, in itself provides an elevating means for the body 13 by drawing the axle assembly 14 forwardly, whereby the body 13 reacts against the radius rods 25 to effect the raising or hoisting movement. However, as previously indicated, I prefer to also utilize the direct thrust of the secondary ram 31, which, desirably, is part of the telescopic cylinder assembly 23, rather than being an independently operated hydraulic ram, which it could be. By using the telescopic cylinder assembly instead of separate independent hydraulic rams, I eliminate the need for additional control mechanism and avoid unnecessary duplication of parts. By the use of differential loading on the hydraulic rams 30 and 31 I am able to obtain a controlled elevating action which accomplishes the objectives of my invention.

The operation of the elevating mechanism will now be described.

When the body 13 is in its lowered position, as shown in FIG. 1 in solid outline, it rests, at its forward end, upon the radius rods or stiff legs 25 by means of the dependent abutments 37. The telescopic cylinder assembly 23 is substantially fully retracted and the nose 32 of the secondary ram 31 contacts the socket 33 on body extension 34 or projects closely adjacent thereto. The ram 31 has no load thereon, as the base plate 20 and fifth wheel 11 support the body 13 through the medium of the rods 25, as previously described. This arrangement relieves the telescopic cylinder of any load stresses during normal transport of the trailer unit 12 by tractor unit 10.

When it is desired to elevate the body 13, the telescopic cylinder 23 is actuated by directing hydraulic fluid into the cylinder through hose connection 35. Due to the extra load or mechanical disadvantage put upon primary ram 30 by the load-compounding inverse block and tackle arrangement, the hydraulic pressure favors actuation of the secondary ram 31, even though it develops less thrust than the primary ram 30. Thus as a result of the differential loading of rams 30 and 31, the lesser loaded ram 31 is caused to extend in advance of the larger ram 30. As ram 31 is projected vertically, it bears against socket 33 and causes elevation of body 13 by pivoting of the body about the axle assembly 14. During the course of elevation, the axle assembly 14 is caused to move forwardly, thus relieving the load on the pulley-cable system so that primary ram 30 follows the extension of secondary ram 31, but only to a proportionate or limited extent.

As the secondary ram 31 approaches the limit of its stroke, there is a continuous discharge of the contents of the body 13 through the opened tail gate 18 which serves to reduce the load on ram 30. Additionally, as body 13 is elevated the rods 25 pivot upwardly, thus providing an increased leverage arm for the thrust of ram 30. Thus, when secondary ram 31 has attained the limit of its stroke, as shown in dotted outline in FIG. 1, the thrust or force of ram 30 is sufficient to overcome the existing load and the load is transferred from ram 31 to ram 30 by means of the cable 52.

Figure 2:
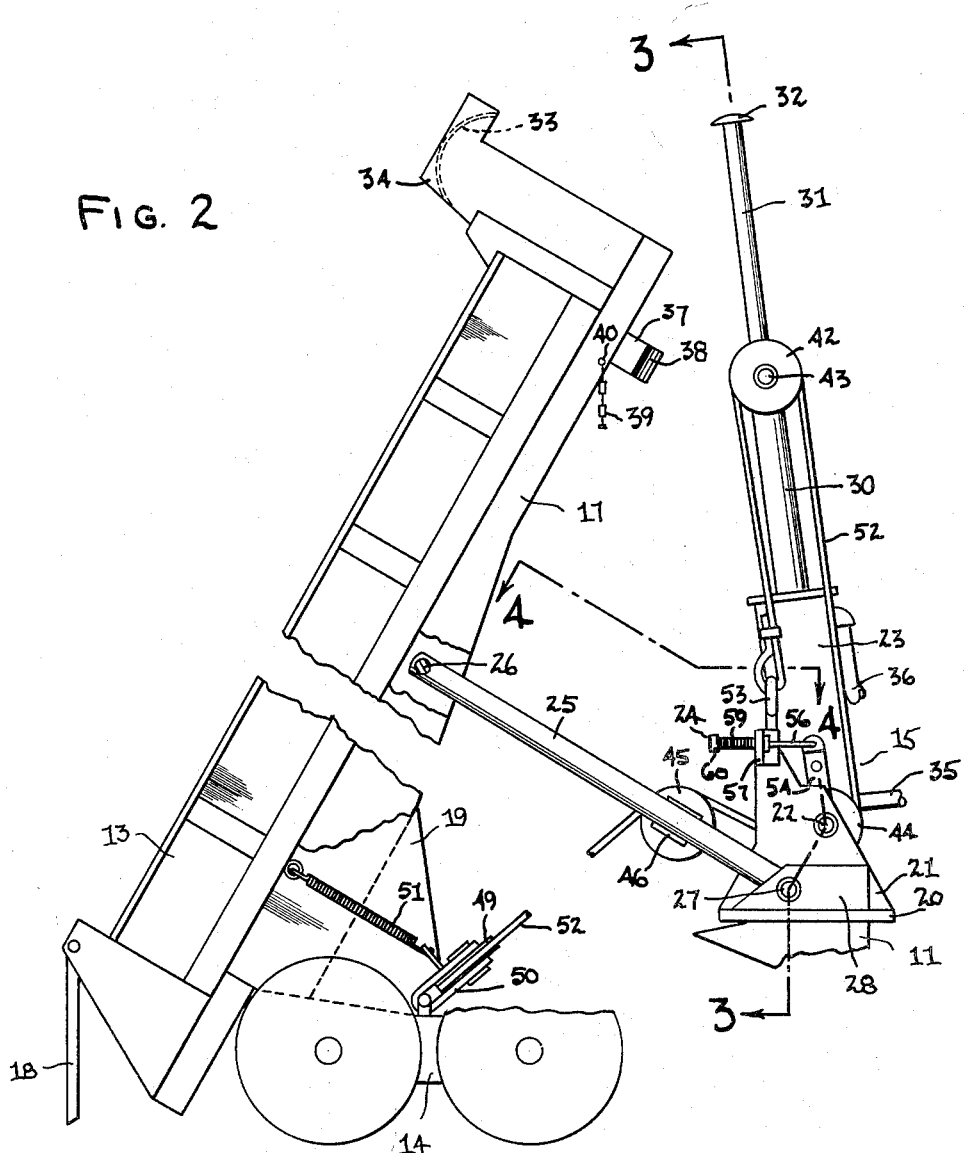
FIG. 2 is a view similar to FIG. 1 but showing the body unit in its position of maximum elevation.
Figure 3:
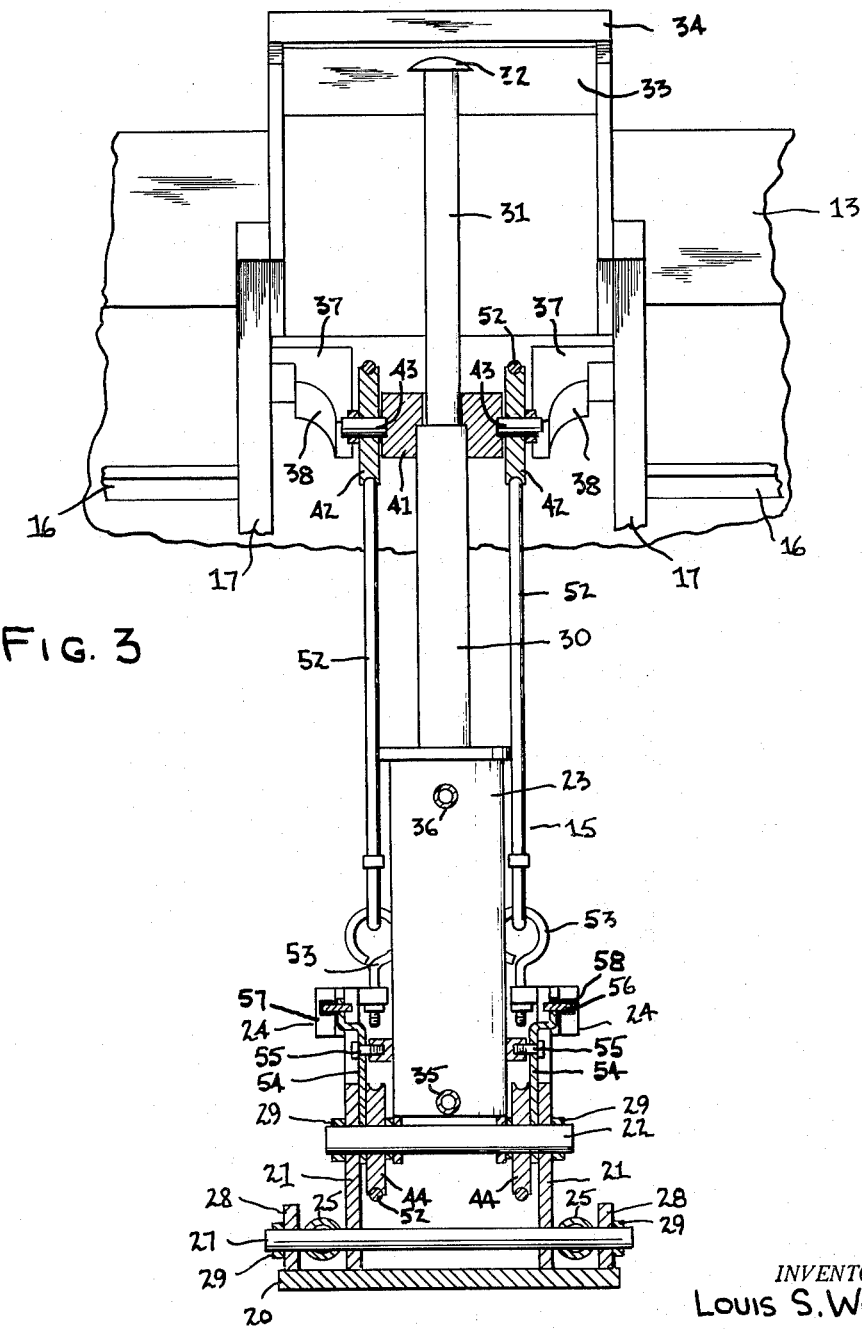
FIG. 3 is a view partly in elevation and partly in section taken on line 3—3 of FIG. 2 and showing the hoist mechanism.

The ram 30 then operates as a fluid motor to actuate the cable-pulley system and draw the axle assembly 14 forwardly against the reaction of the radius rods 25. The forward end of body 13 is thus elevated at a greater rate than the rate of elevation of the actuating or elevating pulleys 42. The socket 33 disengages from the nose 32 of the ram 31 and the forward end of the body is further elevated, without direct contact with telescopic cylinder assembly 23, until the primary ram 30 reaches the end of its stroke. The body 13 is now at its maximum elevation, as shown in FIG. 2 of the drawings. By suitable design, the angularity of the body at maximum elevation can be preselected so that an inclination of 60°, or even more, can be obtained. In this respect, it will be noted that the location of the idler pulleys 45 on the radius rods can be adjusted to change the degree of inclination of the body 13 at maximum elevation. If the pulleys 45 are shifted forwardly on the rods 25, they will cause the effective length of the cable 52 to be shortened to a lesser extent than is the case when the pulleys 45 are shifted rearwardly to a location more remote from the axis of rotation of the rods 25. Thus, the nominal degree of maximum inclination of the body 13 can be increased or decreased by changing the location of the pulleys 45 on the rods 25. The normal slack in the cable 52 will permit a considerable degree of movement of the pulleys 45, and additional adjustment of the cable can be effected at the eyebolts 53, if necessary.

In order to avoid an undesirable pressure buildup which might occur when the hydraulic rams reach the limit of their stroke, it is desirable to provide means for limiting or relieving the hydraulic pressure when the rams are fully extended. This may be accomplished by conventional valve mechanism which can be operated to lock the hydraulic fluid in the cylinder, while at the same time diverting the fluid from the supply hose 35 by recirculation through the hydraulic pump. However, such valve mechanism is generally manually controlled and requires the attention of the operator. In order to avoid the necessity of such manual control, as well as to avoid the use of elaborate actuating linkages which would be required for automatic valve control, I prefer to provide a recirculating hose connection 36 on the cylinder at a point which is operatively substantially coincident with the limit of stroke of the rams. Thus, when the rams are substantially fully extended, the hydraulic fluid is recirculated to the pump through the hose 36, thus preventing any unnecessary hydraulic pressure accumulation in the cylinder while at the same time maintaining a positive pressure in the cylinder to prevent retraction of the rams. By using this arrangement, it is unnecessary to rely upon the operator to manipulate the control valves when the rams reach the limit of stroke. The operator's attention is required only twice; to initiate the extension of the rams, and to initiate the retraction of the rams.

It will be apparent that the location of the recirculating hose connection 36 on the cylinder can be established at an effective point below the mechanical limit of stroke of the rams, if, in a particular application, it is desired that the maximum stroke of the telescopic cylinder be curtailed. Thus the recirculating arrangement provides a simple means of establishing the maximum stroke of the telescopic cylinder without the necessity of otherwise modifying the cylinder.

As the body 13 is initially elevated, the socket 33 moves through an arc. The pivotal mounting of the telescopic cylinder assembly 23 on cross-shaft 22 permits the ram 31 to substantially maintain alignment with the socket 33 as the body is elevated. However, at the transfer point, that is, the point of elevation at which the load is completely transferred from ram 31 to primary ram 30 and the socket 33 disengages from ram 31, it is necessary to arrest further pivotal movement of the cylinder assembly 23 and to maintain the cylinder assembly at its transfer point inclination so that there will be proper alignment of the socket 33 and ram 31 when the body is subsequently lowered. For this purpose, I provide the position regulator 24, previously referred to, details of which are shown in FIG. 4.

The position regulator 24 includes an arm 54 which is fixedly secured to the cylinder 23 as at 55 for pivotal movement therewith about the cross-shaft 22. The arm 54 has pivotally secured thereto one end of a threaded rod or link 56 which slidably traverses a bracket 57 provided on the upright 21. A nut 58 on the rod 56 serves as an adjustable abutment to limit rearward movement of the rod 56 through the bracket 57. A compression coil spring 59 is mounted on the free end of the rod 56 and is retained by a nut 60 so as to bear against bracket 57 and urge the rod rearwardly. The nut 58 is adjusted to a position which will cause it to abut the bracket 57 when the cylinder and arm 54 have been pivoted rearwardly to the transfer point position. Thus further pivotal movement of the cylinder in this direction is arrested. The spring 60 assists in causing the cylinder 23 to maintain alignment with socket 33 during elevation of the ram 31 and also yieldably maintains the cylinder against counter-pivotal movement forwardly from its transfer point position.

Thus when the hydraulic pressure on cylinder assembly 23 is relieved by control of the operator, the weight of the body 13 will cause it to lower. As the body is lowered, the socket 33 reengages the ram 31 which has been maintained in transfer point alignment by the position regulator 24. The weight of the body causes retraction of the rams 30 and 31 and the body returns to its initial horizontal position.

Although I have described only one position regulator 24, it will be understood that preferably a pair of such regulators will be used on opposite sides of the cylinder. Furthermore, it will be apparent that the described cable-pulley arrangement need not employ dual pulleys but could be operative with only single pulleys, in which case the terminal pulley 49 would be eliminated. However, I have described and prefer the dual pulley arrangement as it permits the use of lighter cable and better distribution of the forces involved. The terminal pulley 49 is effective to equalize the tension on the oppositely disposed portions of the cable-pulley assembly as well as serving as an anchor element for the cable 52.

It is to be understood that the forms of my invention, herewith shown and described, are to be taken as preferred examples of the same, and that various changes in the shape, size, and arrangement of parts may be resorted to, without departing from the spirit of my invention, or the scope of the subjoined claims.

Having thus described my invention, I claim:

1. In a load-carrying unit, the combination of a load-carrying body having a forward end and a rearward end, means movably supporting the rearward end of said body, an elevating mechanism associated with said body, said mechanism including a first movable thrust member and an upwardly movable second thrust member, means for movably securing said body in the path of movement of said second thrust member whereby said forward end of said body is elevated, and tension means responsive to movement of said first thrust member coupled to said body to draw said rearward end thereof toward the forward end thereof.

2. In a load-carrying unit, the combination of a load-carrying body having a forward end and a rearward end, means movably supporting the rearward end of said body, a hydraulic cylinder assembly associated with said body, said cylinder assembly including a first movable thrust member and an upwardly movable second thrust member, means for movably securing said body in the path of movement of said second thrust member, whereby said forward end of said body is elevated, and tension means responsive to movement of said first thrust member coupled to said body to draw the rearward end thereof toward the forward end thereof.

3. In a load-carrying unit, the combination of a load-carrying body having a forward end and a rearward end, means movably supporting the rearward end of said body, a hydraulic cylinder assembly associated with said body, said cylinder assembly including a first movable thrust member and an upwardly movable second thrust member, means for pivotally securing said body in the path of movement of said second thrust member, means for coupling said first thrust member to said body to effect forward movement thereof, and means for differentially loading said thrust members to effect sequential movement thereof, whereby said body is elevated in response to movement of each of said thrust members.

4. In a load-carrying unit, the combination of a load-carrying body having a forward end and a rearward end, means movably supporting the rearward end of said body, a fluid-operated telescopic cylinder assembly associated with the forward end of said body, said cylinder assembly including at least two upwardly movable rams, means for pivotally securing said forward end of said body in the path of movement of said rams, tension means responsive to actuation of one of said rams connected to said body to effect forward movement thereof relatively to said cylinder assembly, a compression member interposed between said body and said cylinder assembly, and means for effecting predetermined sequential movement of said rams to elevate said body.

5. In a load-carrying unit, the combination of a load-carrying body having a forward end and a rearward end, means movably supporting the rearward end of said body, a fluid-operated telescopic cylinder assembly, said cylinder assembly including a first ram and second ram, said rams having an upward direction of movement, means pivotally securing said body to said cylinder assembly, said body having a portion thereof disposed in the path of movement of said second ram, a tension means operatively connecting said body to said first ram and effective to move the rearward end of said body toward the cylinder assembly, and means for retarding movement of said first ram when said rams are actuated.

6. In a load-carrying unit, the combination of a load-carrying body having a forward end and a rearward end, means movably supporting said rearward end, a hydraulic cylinder assembly, means pivotally securing said cylinder assembly to said body, first and second thrust members provided by said cylinder assembly, said second thrust member engaging said body to elevate the forward end thereof, tension means responsive to movement of said first thrust member coupled to said body to draw the rearward end thereof toward said cylinder assembly, and load-compounding means associated with said tension means to establish said first thrust member at a mechanical disadvantage relatively to said second thrust member.

7. A combination, as defined in claim 6, wherein said tension means comprises a flexible element and said last-named means comprises a pulley secured to said first thrust member for bodily movement therewith and said flexible element is trained over said pulley and connected at its opposite ends to said body and said cylinder assembly.

8. A combination, as defined in claim 7, wherein said means for securing said cylinder assembly to said body comprises a radius rod pivotally connected to said cylinder assembly at one end thereof and pivotally connected to said body at the other end thereof.

9. A combination, as defined in claim 8, including an idler pulley secured to said radius rod for bodily elevating movement therewith in underlying relationship to said flexible element.

10. In a load-carrying unit, the combination of a load-carrying body having a forward end and a rearward end, means movably supporting said rearward end, and elevating mechanism associated with said body, said elevating mechanism having a first movable thrust member and an upwardly movable second thrust member, means for pivotally securing said body in the path of movement of said second thrust member, means for actuating said second thrust member to engage said body and elevate the forward end thereof to the limit of movement of said second thrust member, means connected to said body and responsive to movement of said first thrust member to effect further elevation of said body beyond the limit of movement of said second thrust member, and means for transferring the load from said second thrust member to said first thrust member upon completion of the body-elevating movement of said second thrust member.

11. A combination, as defined in claim 10, including a base plate, said elevating mechanism being pivotally carried by said base plate, limit means provided on said base plate to arrest pivotal movement of said elevating mechanism relatively to said base plate upon completion of the elevating movement of said second thrust member, and spring means cooperating with said limit means to yieldably maintain said elevating mechanism at said limit of pivotal movement.

References Cited in the file of this patent

UNITED STATES PATENTS

| | | |
|---|---|---|
| 1,728,460 | Weber et al. | Sept. 17, 1929 |
| 1,925,296 | Barrett | Sept. 5, 1933 |
| 2,166,722 | Kirksey | July 18, 1939 |
| 2,517,933 | Schonrock | Aug. 8, 1950 |
| 2,539,086 | Kirksey | Jan. 23, 1951 |
| 2,543,210 | Wagstaff | Feb. 27, 1951 |
| 2,628,126 | Black | Feb. 10, 1953 |
| 2,635,919 | Watson | Apr. 21, 1953 |
| 2,661,236 | Schonrock | Dec. 1, 1953 |
| 2,719,730 | Beck | Oct. 4, 1955 |
| 2,775,480 | Braswell et al. | Dec. 25, 1956 |
| 2,815,980 | Harbers et al. | Dec. 10, 1957 |